S. R. Parkhurst.
Wool Feeding Mach.
№ 47,976.
Fig 2.
Patented May 30. 1865.
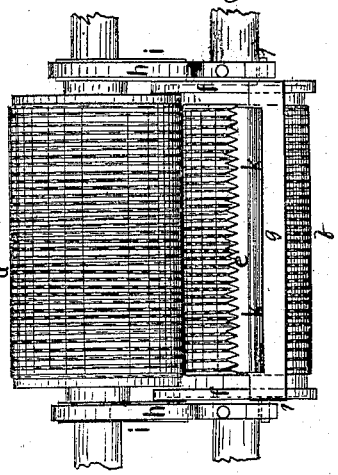
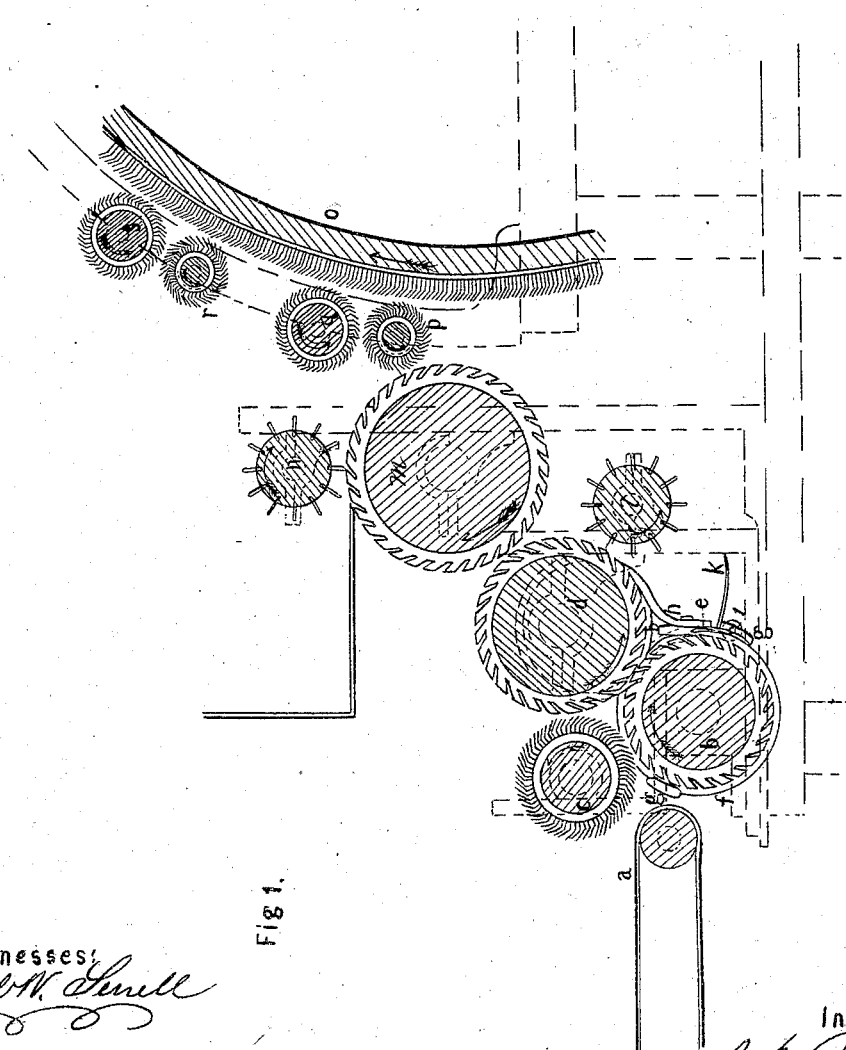
Fig 1.
Witnesses:
Lemuel W. Serrell
Chas. H. Smith
Inventor:
S. R. Parkhurst

UNITED STATES PATENT OFFICE.

S. R. PARKHURST, OF BLOOMFIELD, NEW JERSEY, ASSIGNOR TO EMELY R. PARKHURST, OF SAME PLACE.

IMPROVEMENT IN MEANS FOR FEEDING WOOL AND OTHER FIBROUS MATERIAL TO PICKING, CARDING, AND OTHER SIMILAR MACHINES.

Specification forming part of Letters Patent No. 47,976, dated May 30, 1865.

*To all whom it may concern:*

Be it known that I, STEPHEN R. PARKHURST, of Bloomfield, in the county of Essex and State of New Jersey, have invented, made, and applied to use a certain new and useful Improvement in Means for Feeding Wool and other Fibrous Substances to Picking, Carding, and Similar Machines; and I do hereby declare the following to be a full, clear, and exact description of the said invention, reference being had to the annexed drawings, making part of this specification, wherein—

Figure 1 is a section crosswise of the toothed cylinders employed by me, and Fig. 2 is a detached elevation of my vibrating comb and the cylinders with which it operates.

Similar marks of reference denote the same parts.

The nature of my said invention consists in a vibrating comb applied to and combined with a toothed cylinder, and operating in such a manner that the comb, when moving in one direction, clears the fibers, burrs, &c., out of the teeth of the feeding-cylinder, and the comb itself, when moving in the other direction, is cleaned against the teeth of the cylinder, by which movements the wool or other fiber is loosened and pulled apart gradually. I combine with said feeding-cylinder and vibrating comb a toothed cylinder that conveys the wool or other fiber from the feeding-cylinder, and from the comb to the burring, carding, or picking mechanism with which my improvement may be applied or combined; and I employ a shell vibrating with the comb to catch any loose pieces of wool or other fiber and convey them back to the burring-cylinder.

In the drawings, *a* represents part of a feeding-belt to supply the wool or other fiber to the machine. It might, however, be supplied by a hopper or any other suitable device.

*b* is a feed-cylinder, with inclined teeth, rotated in the direction shown, so that the teeth go backward, and *c* is a feed-roller above, also formed with inclined teeth which move backward. *d* is a third cylinder or roller, which becomes a burring-cylinder, as hereinafter shown. These three cylinders or rollers may have the teeth formed in any desired manner. I, however, prefer and use steel rings with undercut teeth, as shown on cylinders *b* and *d*. The cylinders *b* and *c* act as feed-rollers, and only travel fast enough to convey in the proper amount of fiber. The cylinder *d* travels much faster; hence it combs out the fiber against the points of the teeth on *b* as they travel backward. The fiber is a so held back by the teeth of the feed-roller *c*, and hence is opened and combed by the quicker-moving cylinder *d*, and at the same time any fibers adhering to the teeth of *c* are drawn out, and the cylinder *c* kept clean by the action of the cylinder *d*.

*e* is a comb, the teeth of which point in the same direction as the teeth on the cylinder *b*. This comb is to be vibrated close to the surface of the cylinder *b*, and move up toward and then draw back from the cylinder *d*. This comb *e* is to be vibrated by any suitable device. I, however, prefer and use the following means: *f f* are circular heads placed one at each end of the cylinder *b*, and free to move loosely upon its axis, said heads being of somewhat larger diameter than the cylinder, and connected by bars *g g*, extending from end to end of *b*. One of these bars *g* terminates with projecting pins 1 1, taking the straps *h h* of the eccentrics *i i*, that are affixed to the shaft of the burring-cylinder *d*. These eccentrics give to the heads *f* and bars *g* a vibrating or oscillating movement in the arc of a circle whose center is the axis of *b*, and to one of these bars *g* the aforesaid comb *e* is affixed, and also a shell, *k*, that is curved and comes up nearly to the surface of the burring-cylinder *d*, and is about concentric therewith, when the comb is fully raised by the eccentrics. I provide a stripper, *l*, rotated in the direction indicated, that knocks off burrs from the wool or other fiber that is carried by the teeth of the cylinder *d*. Said burrs fall down upon the floor beneath the machaine; or they may pass into any suitable receptacle. The burring-cylinder *d*, traveling much faster than the feeding-cylinder *b*, communicates to the comb *e*, through the eccentrics, a vibrating movement that is faster than the travel of the surface of *b*; hence when the comb moves back or in the same direction as the surface of *b*, the teeth of *b* will take the wool or other fiber and hold the same as the comb draws out from the fiber, and then the comb, as it moves the other way, (or toward $d$,) cleans the teeth of $b$ of any fibers or burrs that may remain and not have been taken away by the cylinder $d$, and when the comb $e$ comes up toward the cylinder $d$, said cylinder takes the wool from said comb, drawing it away against the said comb-teeth, and opening, loosening, and separating the locks of wool, so that the burrs will fall out freely, and some of the burrs pass down between the comb and cylinder $b$, while others are removed by the stripper $l$.

The object of the shell $k$ is to catch and return to the cylinder $d$ any locks of wool or other fiber that might fall away in being opened by the action of the comb and cylinders $b$ and $d$. This shell $k$ keeps any loose wool up to the cylinder $d$, so that the teeth will firmly hold said fiber, and when the shell is drawn away from the cylinder $d$ it will catch any locks of wool that the stripper $l$ may throw down and carry them again up to the cylinder $d$. The second burring-cylinder, $m$, travels faster than $d$, and takes the wool up in a sheet or bat, exposing the other side to the action of the stripper $n$, the same as in my patent of June 17, 1862.

It has been usual heretofore to employ a toothed cylinder to transfer the fiber from a burring-cylinder to the main carding-cylinder. This is termed the "licker in." To avoid the use of this licker in, and thereby obtain room for a larger number of pairs of workers and strippers in the carding-machine, I place the first stripper, $p$, so as to run contiguous to the burring-cylinder $m$, and transfer the wool or other fiber to the main carding-cylinder $o$. $q$ is the first worker, taking the locks of fiber from $o$ and carrying them to the stripper $p$, by which they are brought back to the burring-cylinder and mixed with the wool passing from that cylinder to the stripper $p$, thus mixing up the wool much more effectually than heretofore. The other pairs of workers, $r$ and $s$, are provided, as usual, and actuated in any convenient manner.

The frame-work for sustaining my cylinders, &c., is to be of any usual or desired character, and pulley and belts or gearing of any usual kind are to be employed for rotating the cylinders, rollers, &c., at the proper speed.

I have only shown a portion of the main carding-cylinder $o$, and the dotted red lines represent a frame that may be employed. It will be evident that any desired character of teeth may be employed on the cylinders $b$, $d$, and $m$, according to the work to be performed, and where the machine is to be employed for carding the fiber a second time after the burrs have been removed, the cylinder $m$ and strippers $l$ $n$ might be dispensed with, and the cylinder $d$ placed contiguous to the main carding-cylinder $o$, or to any other cylinder on a carding-machine; and I do not limit the use of my invention to the burring of wool, but intend to use the whole or any portion thereof for burring, carding, picking, or cleaning any character of fiber, and apply the same to any character of machine where it can be employed.

What I claim, and desire to secure by Letters Patent, is—

1. The combination of a vibrating comb with a toothed cylinder for removing wool or other fiber and foreign substances from the teeth of said cylinder, and also cleaning the teeth of said comb, substantially as specified.

2. The feed-rollers $b$ and $c$, in combination with the vibrating comb, substantially as specified.

3. The combination of a feeding-cylinder, $b$, vibrating comb $e$, and burring-cylinder $d$, for the purposes and substantially as specified.

4. The combination of a shell with the vibrating comb and toothed cylinder $d$, for the purposes and substantially as specified.

5. The heads $f$ $f$, connecting-bars $g$, and eccentrics, in combination with the vibrating comb and cylinders $b$ and $d$, as set forth.

6. The combination of the burring-cylinders $d$ $m$ and strippers $l$ and $n$ with the feed-cylinder $b$ and vibrating comb $e$, substantially as specified.

7. The combination of the burring-cylinder $m$, the stripper $p$, the worker $q$, and the carding-cylinder $o$, substantially as specified, whereby the stripper $p$ transfers the fiber from the burring-cylinder to the carding-cylinder, as set forth.

In witness whereof I have hereunto set my signature this 6th day of January, 1865.

S. R. PARKHURST.

Witnesses:
   LEMUEL W. SERRELL,
   CHAS. H. SMITH.